United States Patent
Lee et al.

(10) Patent No.: US 9,488,764 B2
(45) Date of Patent: Nov. 8, 2016

(54) WIRE GRID POLARIZER AND BACKLIGHT UNIT USING THE SAME

(75) Inventors: Young-Jae Lee, Seoul (KR); Jin Su Kim, Seoul (KR); Jun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 167 days.

(21) Appl. No.: 13/240,028

(22) Filed: Sep. 22, 2011

(65) Prior Publication Data

US 2012/0075830 A1  Mar. 29, 2012

(30) Foreign Application Priority Data

Sep. 29, 2010  (KR) .................. 10-2010-0094292

(51) Int. Cl.
*G02B 5/30* (2006.01)

(52) U.S. Cl.
CPC .................. *G02B 5/3058* (2013.01)

(58) Field of Classification Search
CPC .................................. G02B 5/3058
USPC .............................. 362/97.1–97.4
See application file for complete search history.

(56) References Cited

U.S. PATENT DOCUMENTS

| 6,122,103 A * | 9/2000 | Perkins et al. ........... 359/485.03 |
| 7,113,335 B2 * | 9/2006 | Sales .................... G02B 5/3058 359/485.03 |
| 7,158,302 B2 * | 1/2007 | Chiu et al. .............. 359/485.03 |
| 8,027,087 B2 * | 9/2011 | Perkins et al. .......... 359/485.05 |
| 2007/0242352 A1 * | 10/2007 | MacMaster ................. 359/486 |
| 2010/0214762 A1 * | 8/2010 | Nevitt et al. ................ 362/19 |
| 2011/0084424 A1 * | 4/2011 | Kaida et al. ................ 264/293 |

FOREIGN PATENT DOCUMENTS

| CN | 101055329 A | 10/2007 |
| KR | 10-2010-0041525 A | 4/2010 |
| TW | 546494 B | 8/2003 |
| TW | I223103 B | 11/2004 |
| TW | 200909740 A | 3/2009 |
| WO | WO 2010117249 A2 * | 10/2010 ........... G02B 5/3058 |

* cited by examiner

*Primary Examiner* — Robert May
(74) *Attorney, Agent, or Firm* — Saliwanchik, Lloyd & Eisenschenk

(57) ABSTRACT

Provided are a wire grid polarizer and a backlight unit using the wire grid polarizer. The wire grid polarizer comprises a first grid layer formed on a substrate and provided with at least one of a first grid pattern, and a second grid layer formed on the first grid pattern and provided with at least one of a second grid pattern made of metal material wherein the first grid layer is made of high molecular substance having a lower refraction index than that of the substrate. By forming a first grid pattern on a substrate using a high molecular substance layer and by forming a metal grid pattern on the first grid pattern, transmission rates of respective wavelengths depending on light angles of incident light are controlled and thereby minimize color variations depending on view angle.

11 Claims, 9 Drawing Sheets

X = 0nm

WIRE GRID POLARIZER AND BACKLIGHT UNIT USING THE SAME

CROSS-REFERENCE TO RELATED APPLICATION

This application claims the benefit under 35 U.S.C. §119 of Korean Patent Application No. 10-2010-0094292, filed on Sep. 29, 2010, which is hereby incorporated by reference in its entirety.

BACKGROUND OF THE INVENTION

1. Field of the Invention

The present invention relates to a wire grid polarizer and a backlight unit manufactured using the wire grid polarizer in which by controlling transmission rates of respective wavelengths depending on angles of incident lights, color variations can be minimized.

2. Description of the Related Art

In general, a polarizer or polarizing device refers to as an optical device for drawing linearly polarized light having a specific vibration direction among non-polarized lights such as natural light. In addition, a wire grid polarizer is a kind of optical devices for producing polarized light using a conductive wire grid. The wire grid polarizer has been used as a reflective polarizer in an infrared wavelength region since it has a high polarization separation capability, compared with other polarizers.

Generally, in a case where a cycle of metal line placement is shorter than a half-wavelength of an incident electromagnetic wave, a polarized component (s wave) parallel to the metal line is reflected and a polarized component (p wave) vertical to the metal line is transmitted. Here, a planar polarizer having an excellent polarization efficiency, a high transmission rate and a wide view angle cab be manufactured using the phenomenon as described above, which refers to as a wire grid polarizer.

FIG. 1 is a view illustrating a configuration and function of a prior wire grid polarizer wherein metal grids 2 having a predetermined thickness h are placed on a substrate 1 in a predetermined cycle A and the cycle of fine metal grid of a wire grid polarizer may be less than a half of a visible light wavelength. In case where the cycle of a metal line in the wire grid polarizer is much smaller than a wavelength of incident light, when non-polarized light is incident, a component having a vector orthogonal to a conductive wire grid, i.e., p polarized light is transmitted, and a component having a vector parallel to the wire grid, i.e., s polarized light is reflected.

In the prior wire grid polarizer, a polarization plate of a reflective-type is manufactured by forming fine metal grids directly on a substrate; however, as an incident angle becomes larger through the fine metal grid formed directly over a substrate, a transmission rate is varied depending on a wavelength of incident light and thus a color implementation depending on a view angle is limited.

BRIEF SUMMARY

The present invention has been proposed to solve the above drawbacks and an aspect of the present invention is directed to a wire grid polarizer in which by forming a first grid pattern on a substrate using a high molecular substance layer and by forming a metal grid pattern on the first grid pattern, transmission rates of respective wavelengths depending on light angles of incident light are controlled and thereby minimizing color variations depending on view angles.

An object of the present invention relates to provide a wire grid polarizer comprises a first grid layer formed on a substrate and provided with at least one of a first grid pattern, and a second grid layer formed on the first grid pattern and provided with at least one of a second grid pattern made of metal material wherein the first grid layer is made of high molecular substance having a lower refraction index than that of the substrate.

A ratio of width to height of the first grid pattern is 1:0.2-5.

Specially, a width of the first grid pattern is in a range of 10-200 nm, and a height of the first grid pattern is in a range of 10-500 nm, and furthermore a cycle of the first grid pattern is 100-250 nm.

The second grid pattern forming the wire grid polarizer is made of one or alloy of Aluminum, Chrome, Silver, Copper, Nickel and Cobalt.

In addition, a ratio of a first grid pattern width to a second grid pattern width is 1:0.2-1.5, and in this case a width of the second grid pattern is 2-300 nm, and a ratio of width to height of the second grid pattern is 1:0.5-1.5.

Further, a sectional shape of the second grid pattern is one of being rectangular, being triangular and semi-circular; however, the shape is not limited thereto.

In the wire grid polarizer according to the present invention, the substrate comprises at least one of glass, quartz, acryl, polycarbonate and PET.

Meanwhile, a backlight is configured using the wire grid polarizer as followings.

In more detail, a backlight unit comprises a first substrate for guiding forwardly light emitted from a light source, a second substrate arranged on the first substrate, a wire grid polarizer as described above, which is arranged on an upper surface or a lower surface of the first substrate or the second substrate, and further a reflection plate arranged on a lower side of the first substrate.

Specially, the first substrate is a substrate or an optical sheet performing at least one function of diffusing light, guiding light, collecting light, and further a thickness of the second substrate is 10 μm-5 mm. At this time, a visible light transmission rate of the second substrate is 70% or more.

BRIEF DESCRIPTION OF THE DRAWINGS

The above and other aspects, features and advantages of certain exemplary embodiments of the present invention will be more apparent from the following description taken in conjunction with the accompanying drawings, in which.

REFERENCE NUMERALS

Figure 1:
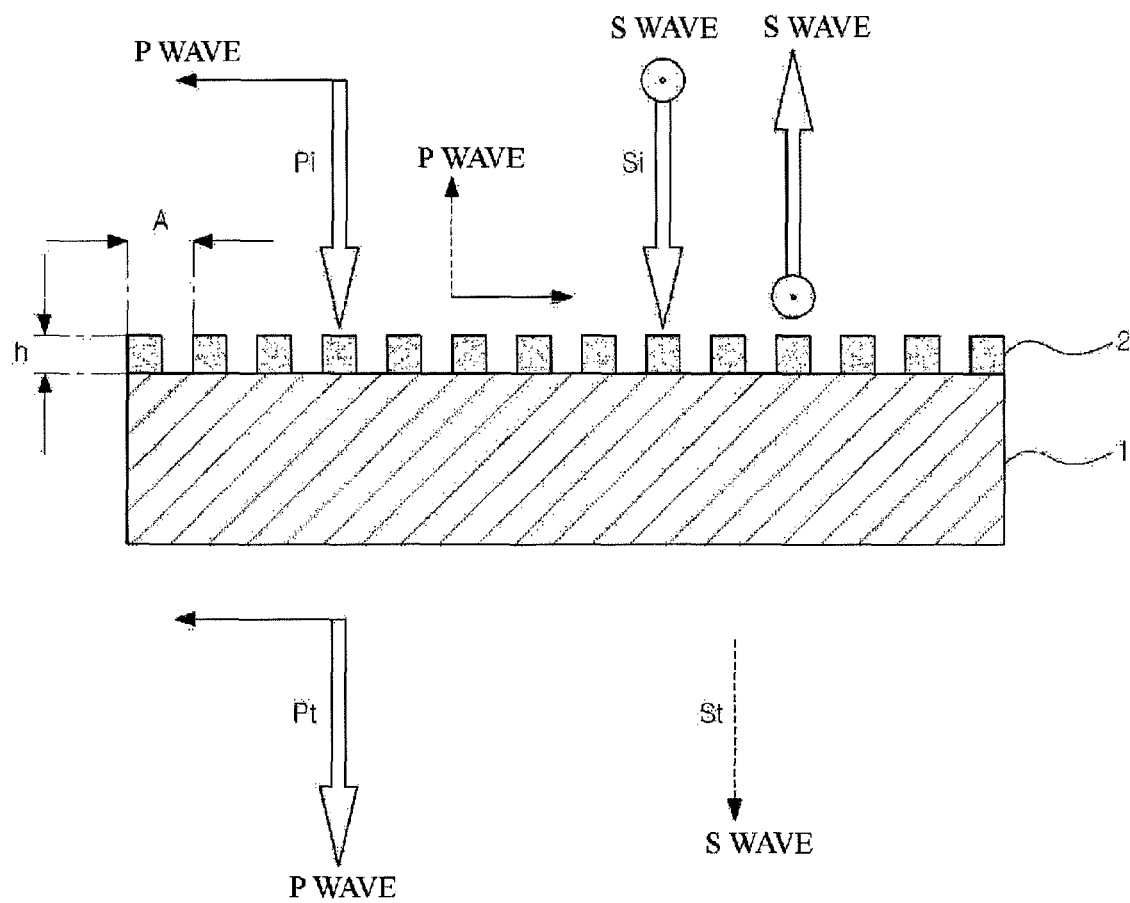
FIG. 1 is a view illustrating a configuration and a function of a prior wire grid polarizer.

110: substrate
120: first grid layer
121: first grid pattern
130: second grid pattern

DETAILED DESCRIPTION

Exemplary embodiments of the present invention will be described below in detail with reference to the accompanying drawings. Wherever possible, the same reference numerals will be used to refer to the same elements throughout the specification, and a duplicated description thereof will be omitted. It will be understood that although the terms "first", "second", etc. are used herein to describe various elements, these elements should not be limited by these terms. These terms are only used to distinguish one element from another element.

The gist of the present invention relates to provide a wire grid polarizer in which grid shapes are formed periodically on a dielectric layer of high molecular substance formed on a substrate and a transmission rate of a low-wavelength depending on a large incident angle is maximized and thereby inducing enlargement of view angle and minimizing color variations.

Figure 2:
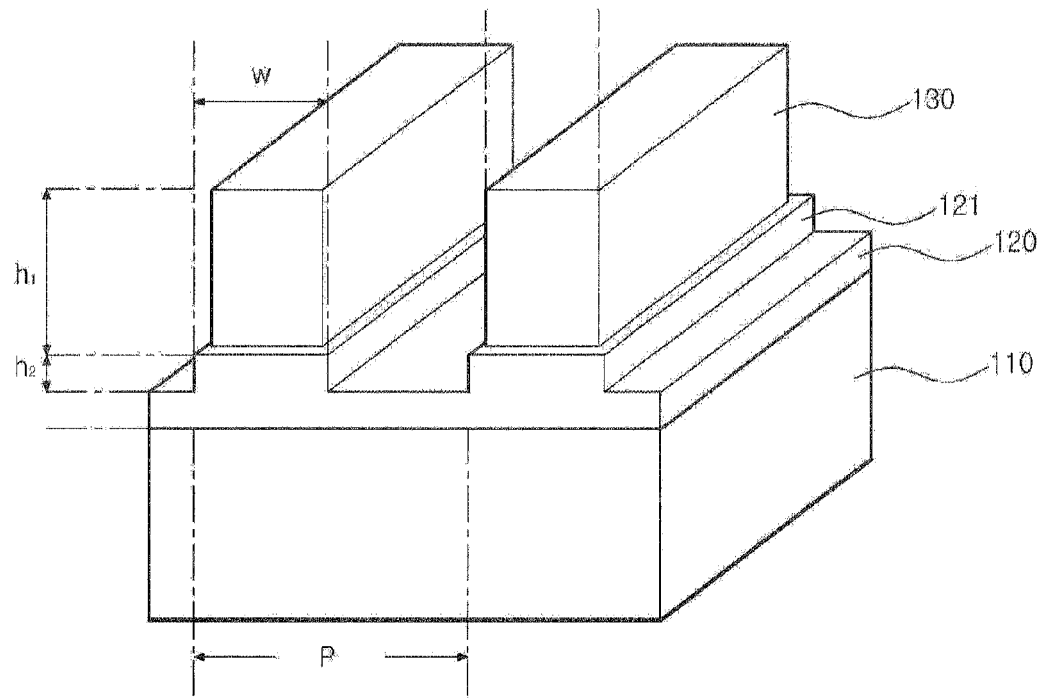
FIGS. 2 and 3 are a perspective view and a sectional view illustrating a configuration of a wire grid polarizer according to the present invention, respectively.
Figure 3:
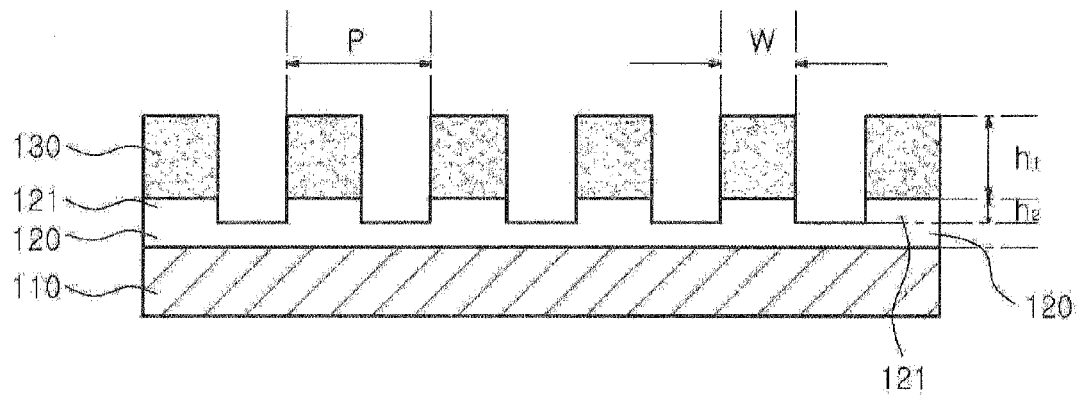

FIG. 2 is a perspective view illustrating main constitutional elements of a wire grid polarizer according to the present invention, and FIG. 3 is a sectional view of FIG. 2.

Referring to FIGS. 2 and 3, a wire grid polarizer according to the present invention may include a first grid layer 120 provided with a least one of a first grid pattern 121 on a substrate 110, and a second grid layer provided with at least one of a second grid pattern 130 made of metal material on the first grid pattern 121 wherein the first grid layer 120 may be made of high molecular substance having a lower refraction index than that of the substrate.

Here, the substrate 110 may be made of various high molecular substances including glass, quartz, acryl, polycarbonate and PET, through which visible light is transmitted. Of course, the substrate may be made of film base material for an optics, having a predetermined flexibility.

Further, the first grid layer 120 to be laminated on the substrate 110 may be made of high molecular substance and first grid patterns 121 of projection patterns in a predetermined cycle may be formed on a surface of the first grid layer. That is, the first grid layer 120 may be provided with a plurality of the first grid patterns of projection patterns in a predetermined cycle on a surface of a resin layer formed with polymer. Specially, the first grid layer 120 according to the present invention may be made of material having a lower refraction index than that of the substrate 110. Further, a ratio of width to height of the first grid pattern 121 may be 1:0.2-5 wherein a width w of the first grid pattern may be 10-200 nm and a height h1 thereof may be 10-500 nm, and a cycle of the first grid pattern may be 100-250 nm.

Meanwhile, the second grid layer is defined as calling inclusively one layer provided with a plurality of second grid patterns 130 of metal grid pattern formed on the first grid pattern 121. That is, in the second grid pattern 130 fine projection patterns of metal material may be placed in a predetermined cycle and the projection patterns may be formed on the first grid pattern 121 using a deposition process. Here, the second grid pattern 130 may be formed with one or alloy of aluminum, chrome, silver, copper, nickel and cobalt. The cycle refers to as a distance between one metal grid pattern (second grid pattern) and an adjacent metal grid pattern (second grid pattern).

Additionally, a sectional shape of the second grid pattern 130 may be rectangular, triangular, and semi-circular and further be a metal line shape formed a portion of substrate patterned as a triangular shape, a rectangular shape or a sign wave. That is, regardless of the sectional shape any metal lines extended in a length way of one direction, having a predetermined cycle may be employed as the second grid pattern. In this case, the cycle may be less than a half of a wavelength of employed light and thus the cycle may be 100-250 nm. Further, in a preferable embodiment of the present invention, a ratio of width to height of the second grid pattern 130 may be 1:0.5-1.5, and specially a width ratio of the first grid pattern and the second grid pattern may be 1:0.2-1.5 wherein the width of the second grid pattern may be 2-300 nm.

Furthermore, in a wire grid polarizer according to the present invention, a transmission rate depending on respective width and height of two grids (first and second grid patterns) may be adjusted. As a grid width widens in a same pitch, the transmission rate may be lowered and depolarization rate is increased wherein a polarization characteristics increases as a pitch decreases in order to ensure a maximum polarization efficiency, and in a case where the pitch is formed as a distance between the same grids and a width of the same grid, the polarization characteristics increases as a grid height increases, and in a case where the pitch is formed as a distance between the same grids and a height of the same grid, the polarization characteristics is improved as a grid width increases. In this case, a width of the first grid may be adjusted to being 0.2-1.5 times wider than a width of the second grid pattern.

Figure 4:
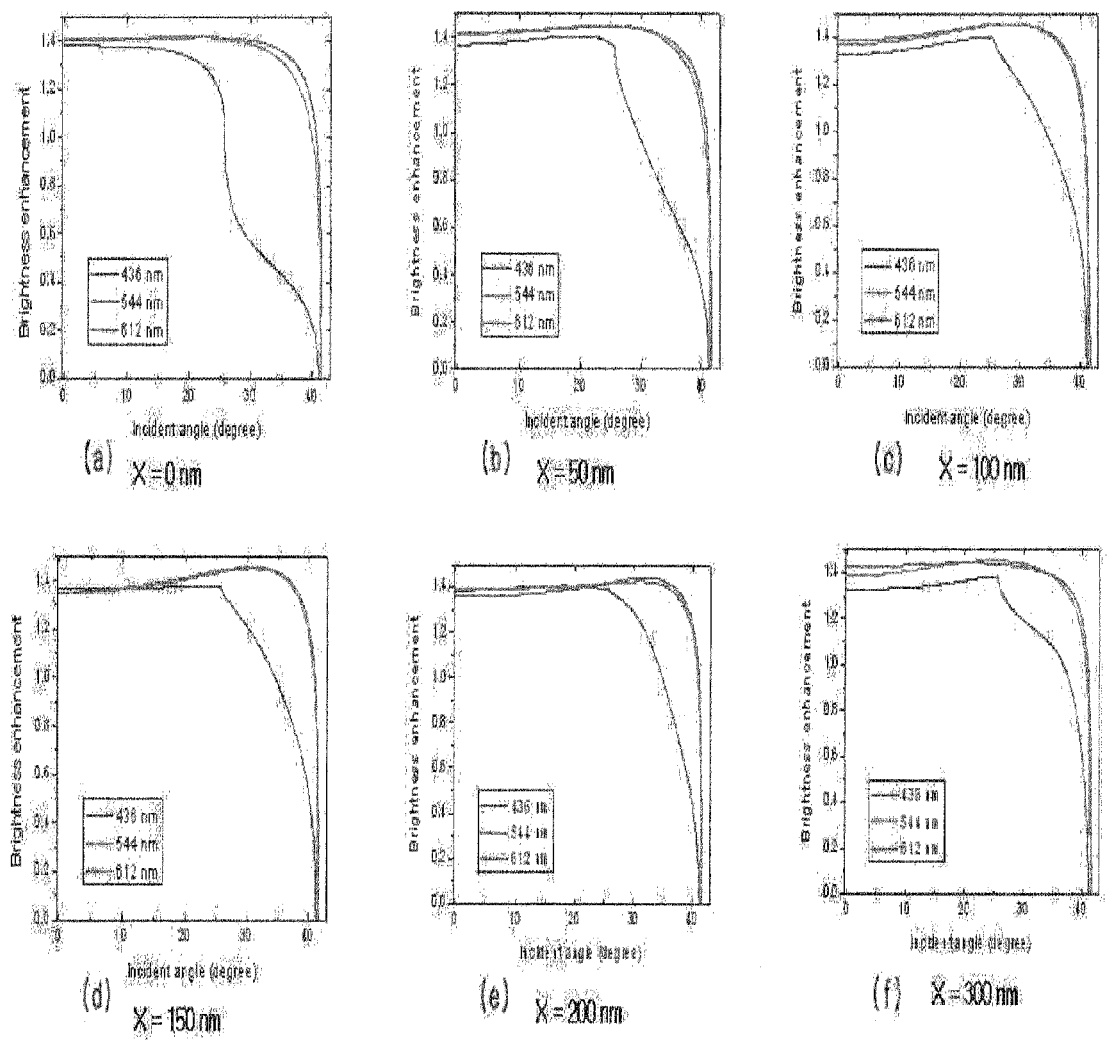
FIG. 4 are graphs illustrating simulation results of transmission rate variations of each wavelength per a view angle depending on a height of a first grid pattern of a dielectric body in the wire grid polarizer according to the present invention.
Figure 4A:
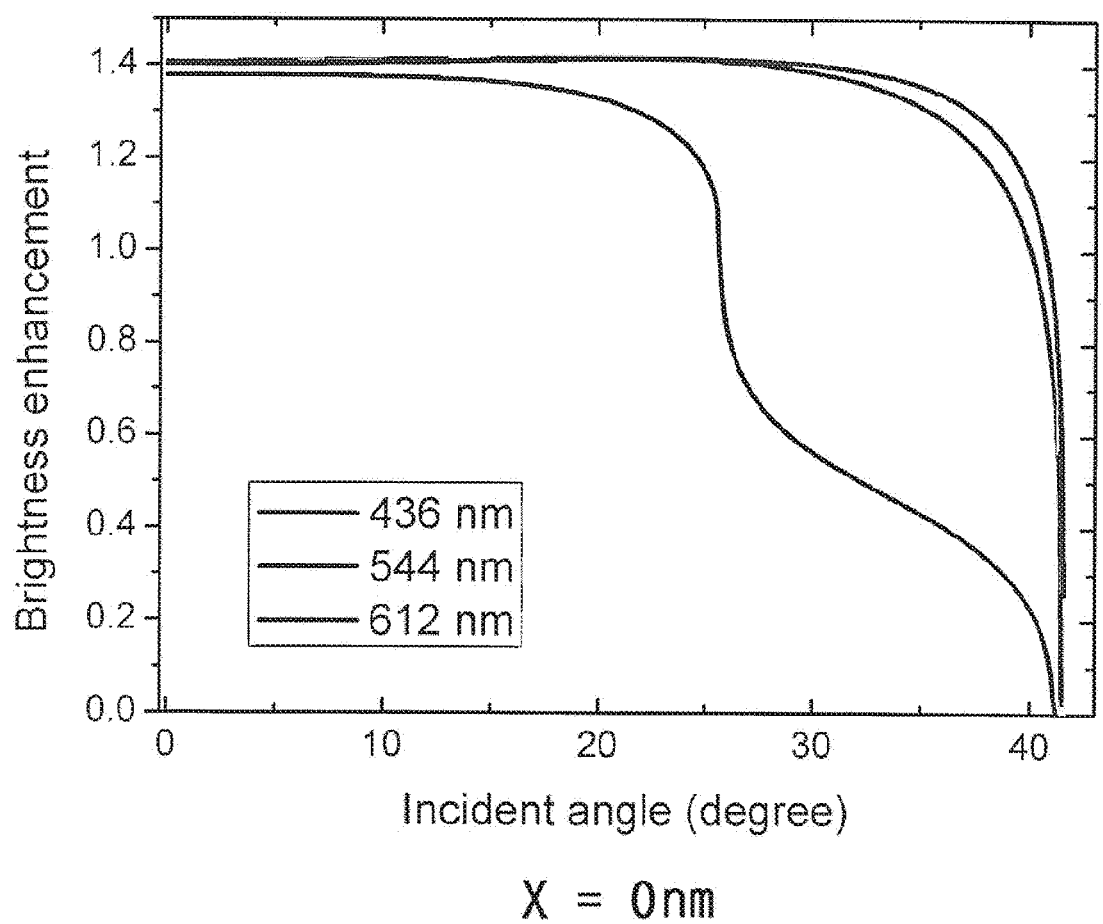
Figure 4B:
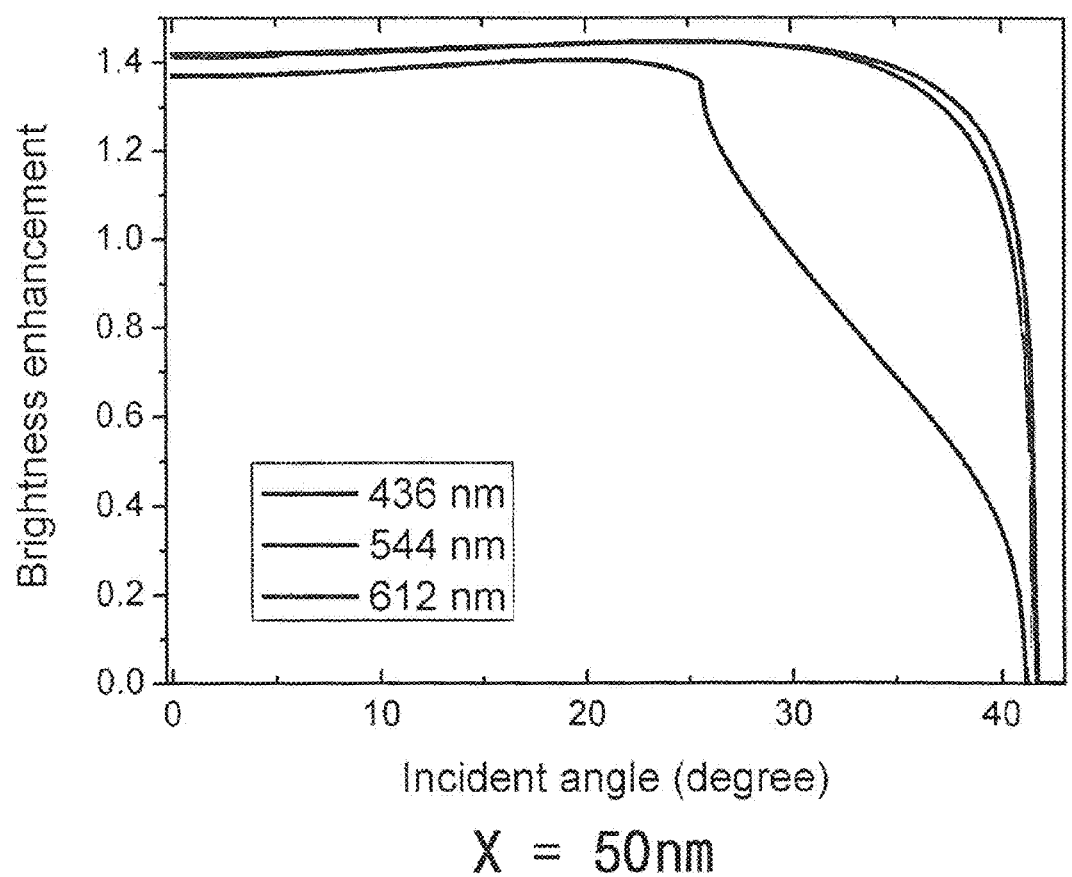
Figure 4C:
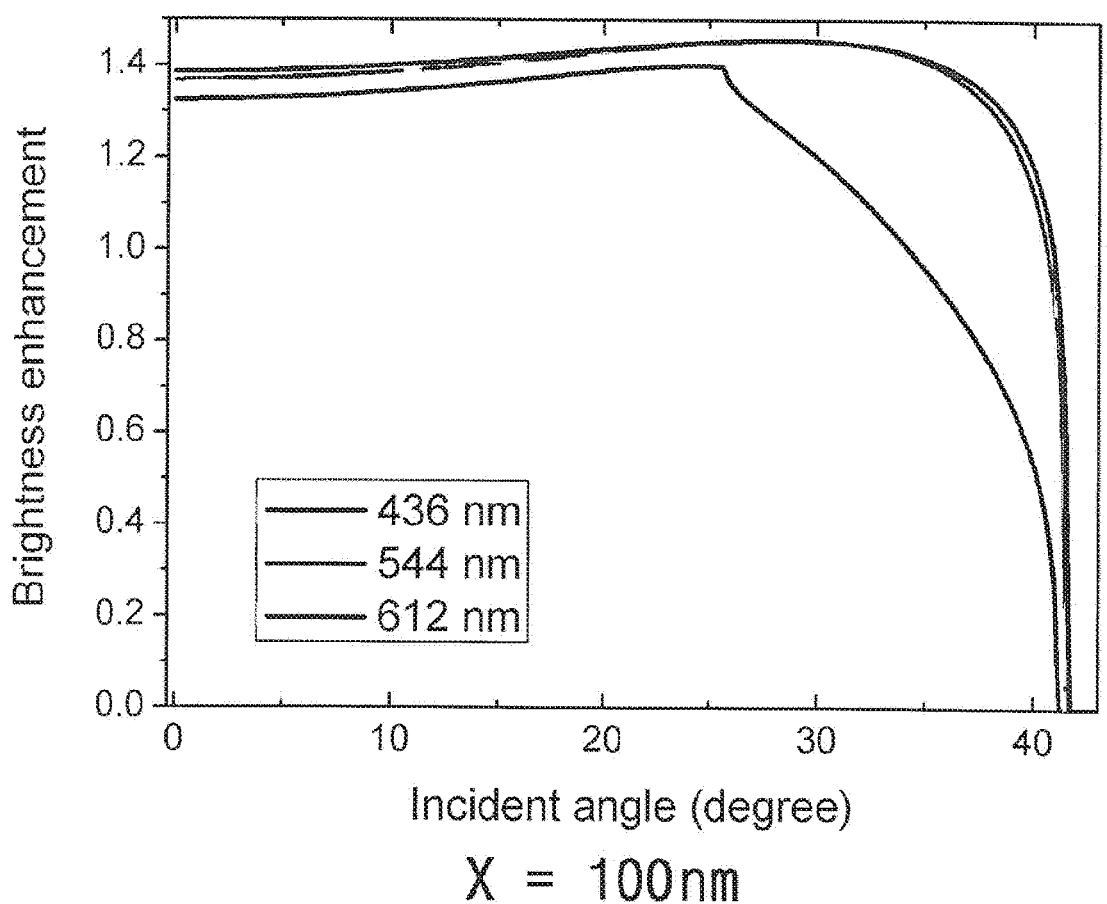
Figure 4D:
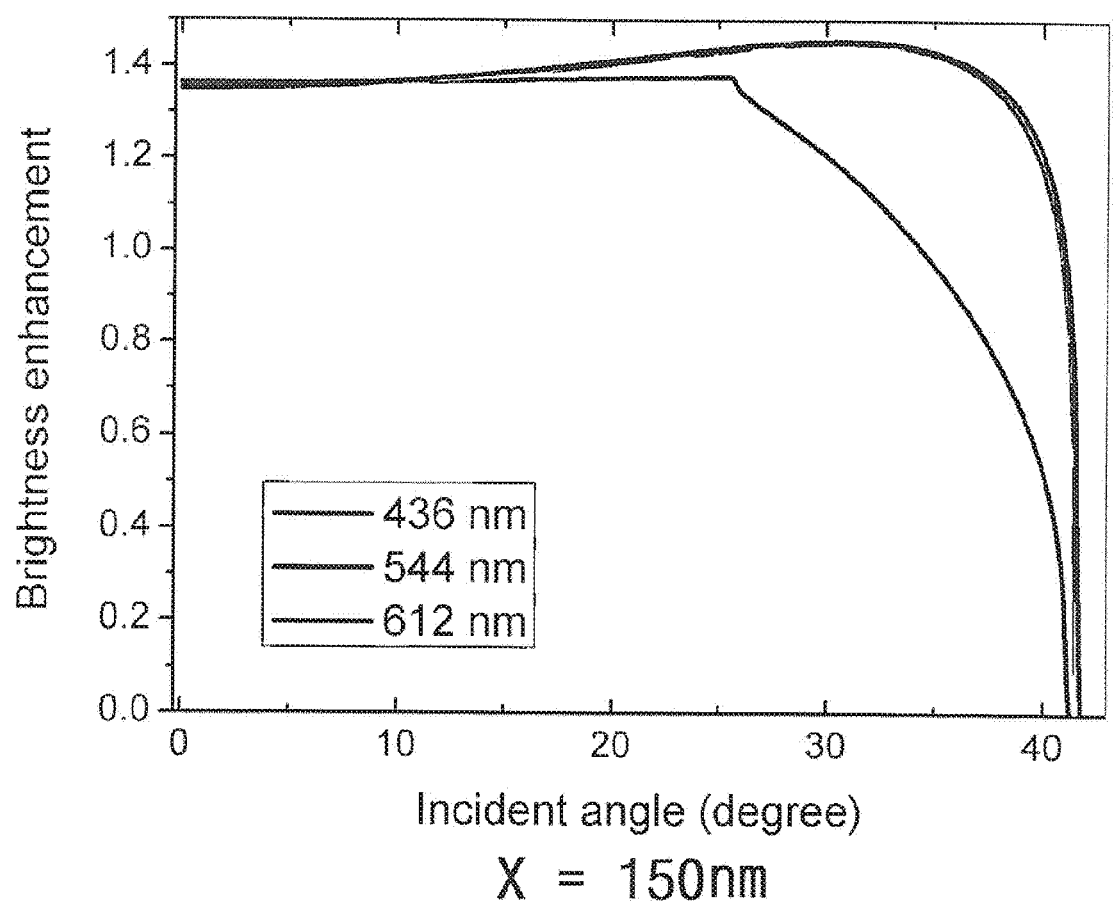
Figure 4E:
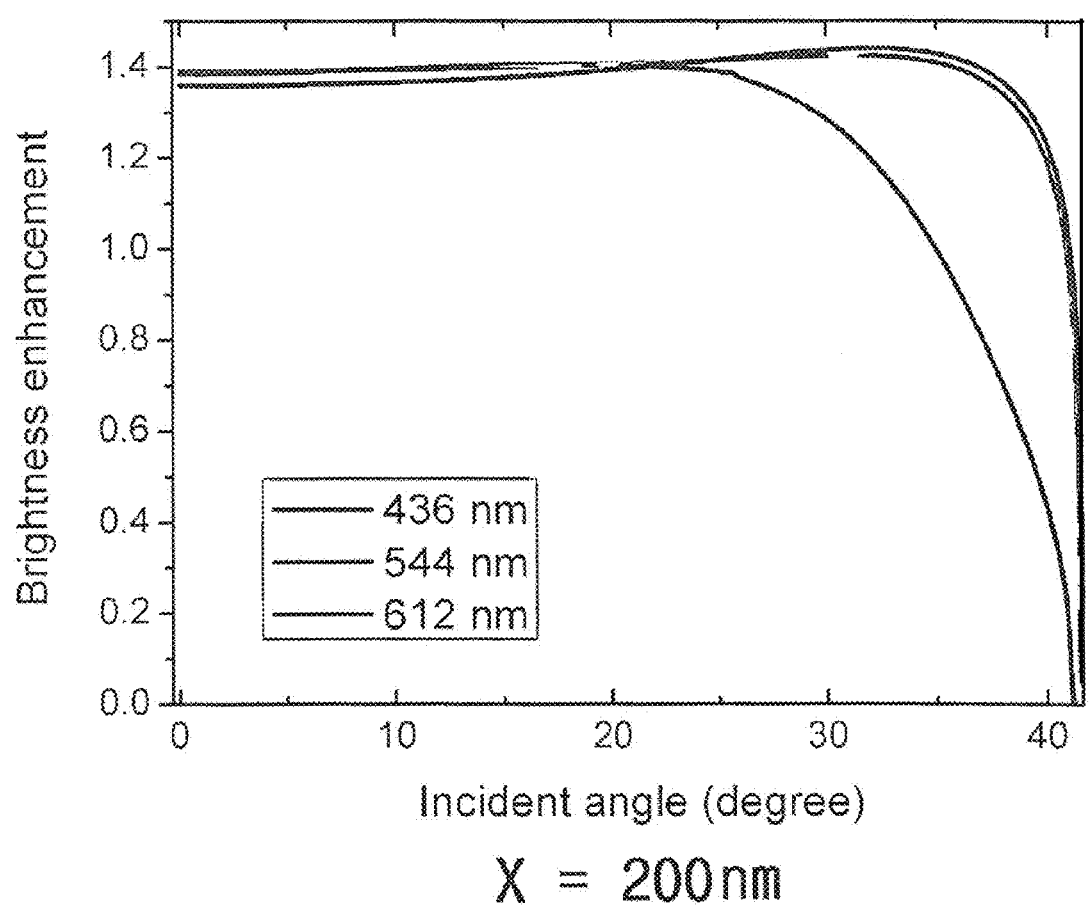
Figure 4F:
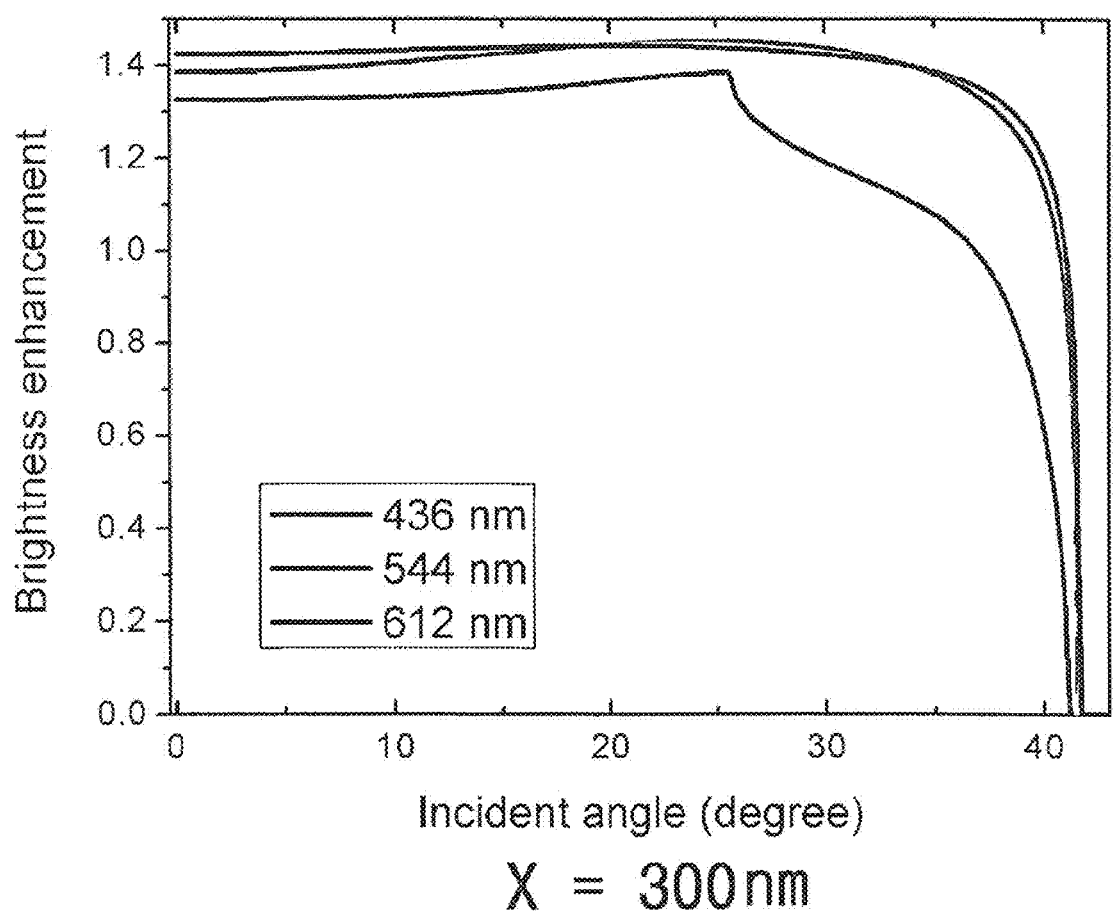

FIG. 4 are graphs illustrating simulation results of transmission rate variations of each wavelength per a view angle depending on a height of a first grid pattern of a dielectric body in the wire grid polarizer according to the present invention.

That is, transmission rate variations, i.e., brightness enhancement variations per each wavelengths of respective view angles are shown in cases of wavelengths (a) X=0 nm, (b) X=50 nm, (c) X=100 nm, (d) X=150 nm, (e) X=200 nm, and (d) X=300 nm.

Referring to the results shown in FIG. 4, in a case where there is no first grid layer provided with a first grid pattern, a high color implementation rate is achieved since Red, Green and Blue lights are emitted evenly from a front surface of the wire grid polarizer; however, the color implementation rate is decreased greatly in a case where view angle is increased and thus the transmission rate is lowered. Accordingly, from confirming a transmission rate of Blue light by varying a height of the first grid pattern according to the present invention, the transmission rate increased gradually to be a maximum value at about 200 nm of a height of the first grid pattern to increase the color implementation rate.

A backlight unit may be configured using the wire grid polarizer according to the present invention. That is, one or more of the wire grid polarizer may be provided to a general backlight unit including a light source, a light guide plate and an optical sheet. In the wire grid polarizer as shown in FIG. 2, according to the present invention, even though the first and second grid patterns are provided on one surface of the substrate, it has to be understood that they may be provided on both surfaces of the substrate to form surface treatment layers.

That is, as a general backlight configuration, a first substrate for guiding forwardly the light emitted from a light source may be provided and a second substrate may be provided on the first substrate. The first substrate may perform one or more functions of guiding light, diffusing light, and collecting light, and further the second substrate may perform diffusion and prism functions. At this time, a thickness of the second substrate may be 10 μm-5 mm and a transmission rate of visible light may be 70% or more.

Here, the wire grid polarizer may be arranged on an upper surface or a lower surface of the first substrate or the second substrate and further a reflection plate may further provided on a lower surface of the first substrate.

Specially, in a case where two or more wire grid polarizers are arranged, metal material of metal grid pattern of respective wire grid polarizer may be different from each other.

Furthermore, the wire grid polarizer may be used for a liquid crystal display provided with the backlight unit and further for a display device to display 3D image, which may be widely used for ensuring high brightness and reliability.

According to the present invention, by forming a first grid pattern on a substrate using a high molecular substance layer and by forming a metal grid pattern on the first grid pattern, transmission rates of respective wavelengths depending on light angles of incident light are controlled and thereby minimizing color variations depending on view angle.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A wire grid polarizer, comprising:
a first grid layer formed on a substrate and provided with at least one first grid pattern; and
a second grid layer formed on the at least one first grid pattern and provided with at least one second grid pattern made of metal material,
wherein the first grid layer is made of a high molecular substance formed with a polymer and having a refraction index lower than that of the substrate,
wherein the substrate is made of a film base material having a predetermined flexibility,
wherein a cycle of the second grid pattern is 100 nm through 250 nm and a height of the first grid pattern is 200 nm for providing a maximum value of transmission rate of visible light and a ratio of width to height of the at least one first grid pattern is in a range of 1:0.2-4,
wherein a ratio of a width of the first grid pattern to a width of the second grid pattern is at least 1:0.2 and less than 1:1,
wherein a length of the second grid pattern is shorter than a length of the first grid pattern,
wherein the widths of the first and second grid patterns are measured in a first direction parallel to an upper surface of the substrate, and
wherein the lengths of the first and second grid patterns are measured in a second direction parallel to the upper surface of the substrate and perpendicular to the first direction.

2. The wire grid polarizer of claim 1, wherein the width of the first grid pattern is in a range of 50-200 nm.

3. The wire grid polarizer of claim 1, wherein the second grid pattern is made of one or alloy of Aluminum, Chrome, Silver, Copper, Nickel and Cobalt.

4. The wire grid polarizer of claim 3, wherein the width of the second grid pattern is in a range of 2-250 nm.

5. The wire grid polarizer of claim 4, wherein a ratio of width to height of the second grid pattern is 1:0.5-1.5.

6. The wire grid polarizer of claim 3, wherein a sectional shape of the second grid pattern is one of being rectangular, triangular and semi-circular.

7. A backlight unit, comprising:
a first substrate for guiding forwardly light emitted from a light source;
a second substrate arranged on the first substrate; and
a wire grid polarizer of claim 1, which is arranged on an upper surface or a lower surface of the first substrate or the second substrate.

8. The backlight unit of claim 7, which further comprises a reflection plate arranged on a lower side of the first substrate.

9. The backlight unit of claim 7, wherein the first substrate is a substrate or an optical sheet performing at least one function of diffusing light, guiding light, and collecting light.

10. The backlight unit of claim 9, wherein a thickness of the second substrate is 10 μm-5 mm.

11. The backlight unit of claim 10, wherein a visible light transmission rate of the second substrate is 70% or more.

* * * * *